US008331936B2

(12) United States Patent
Alonso-Rubio et al.

(10) Patent No.: US 8,331,936 B2
(45) Date of Patent: Dec. 11, 2012

(54) AUTOMATIC HANDOVER OSCILLATION CONTROL

(75) Inventors: Jose Alonso-Rubio, Stockholm (SE); Fredrik Gunnarsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 500 days.

(21) Appl. No.: 12/431,380

(22) Filed: Apr. 28, 2009

(65) Prior Publication Data

US 2010/0273487 A1 Oct. 28, 2010

(51) Int. Cl.
*H04W 36/00* (2009.01)
(52) U.S. Cl. ........ 455/436; 370/331; 370/332; 370/508; 714/26
(58) Field of Classification Search .................. 455/436; 370/331, 332, 508; 714/28
See application file for complete search history.

(56) References Cited

U.S. PATENT DOCUMENTS

| 5,524,009 | A | * | 6/1996 | Tuutijarvi et al. | 370/332 |
| 5,995,836 | A |  | 11/1999 | Wijk et al. | |
| 5,999,814 | A |  | 12/1999 | Cuffaro et al. | |
| 6,085,335 | A | * | 7/2000 | Djoko et al. | 714/26 |
| 6,285,883 | B1 |  | 9/2001 | Bringby et al. | |
| 6,745,033 | B1 |  | 6/2004 | Shah et al. | |
| 7,248,873 | B2 | * | 7/2007 | Lehtinen et al. | 455/436 |
| 2004/0266434 | A1 | * | 12/2004 | Lehtinen et al. | 455/436 |
| 2006/0003768 | A1 |  | 1/2006 | Chiou | |
| 2006/0251130 | A1 | * | 11/2006 | Greer et al. | 370/508 |
| 2008/0096560 | A1 | * | 4/2008 | Felske et al. | 455/436 |
| 2010/0273487 | A1 | * | 10/2010 | Alonso-Rubio et al. | 455/436 |
| 2010/0284374 | A1 | * | 11/2010 | Evans | 370/332 |
| 2011/0026492 | A1 | * | 2/2011 | Frenger et al. | 370/331 |

FOREIGN PATENT DOCUMENTS

WO WO 99/57933 11/1999

OTHER PUBLICATIONS

NGMN Alliance et al., NGM Recommendation on Son & O&M Requirements, Version 1.23, Dec. 5, 2008.
International Search Report and Written Opinion mailed May 19, 2010 in corresponding PCT Application PCT/EP2010/053903.
Markopoulos, A., et al., "Performance of Cellular Networks and Mobile Location-Driven Handover Algorithms", May 17, 2004, Vehicular Technology Conference, 2004, VTC 2004-Spring, 2004 IEEE 59th Milan, Italy, pp. 2430-2436, XP010766596.

* cited by examiner

*Primary Examiner* — William D Cumming
(74) *Attorney, Agent, or Firm* — Nixon & Vanderhye P.C.

(57) ABSTRACT

A method and apparatus are provided for use in a cellular radio communication system for adjusting a handover parameter. Information is collected regarding actual handovers that have occurred between one or more pairs of cells as well as handover failures. The collected handover information is processed to determine a handover oscillation rate or a handover cost associated with the cell pair. If the handover performance is determined to be acceptable, the determined handover oscillation rate or the determined handover cost is compared with a predetermined target handover oscillation rate or a predetermined target handover cost, respectively. One or more handover parameters associated with at least one of the cells in the cell pair is adjusted based on the comparison.

28 Claims, 14 Drawing Sheets

| Source \ Target | Cell 1 | Cell 2 | Cell 3 | Cell 4 |
|---|---|---|---|---|
| Cell 1 | N/A | 2;4;6.2;8;6;1... | 15.2;15.4;30 | 0.1;0.2;0.1 |
| Cell 2 | 0.1 | N/A | 0.4;1;5;0.1;6 | |
| Cell 3 | 0.9;10;10.2 | 0.2;4;1 4... | N/A | 10;5;4;7;8;4... |
| Cell 4 | 0.2;0.2;0.3 | 2;4;6.2;8;6;1... | 0.4;25;0.1;6 | N/A |

AUTOMATIC HANDOVER OSCILLATION CONTROL

TECHNICAL FIELD

The technical field relates to radio telecommunications, and particularly, to controlling handover of mobile station connections in a cellular communications system.

BACKGROUND

A mobile radio communication system, such as a UMTS (Universal Mobile Telecommunication System) type system, includes a mobile radio communication network communicating with mobile terminals or UEs (User Equipments) and with external networks. Traditionally, communications are facilitated using one or more radio base stations that provide radio coverage for one or more cell areas. Various standards for cellular mobile communications include procedures to handover different UEs from one cell to another depending on the experienced radio conditions (e.g. moving UEs). This is the case of 3GPP standards such as GSM, WCDMA, or LTE. The technology in this application may be applied to handover procedures within any cellular mobile communication technology that supports handover including handover from one radio access technology to a different radio access technology (e.g., IRAT HO).

FIG. 1 shows a simplified cellular radio communications system with three cells 1-3 each having an associated base station (BS). As a UE actively involved in a radio connection currently being serviced by cell 1 moves farther away from base station BS1 to cell 3 and base station BS3, the radio connection is handed over to cell 3, which then becomes the serving cell for that connection.

In a typical handover procedure, the UE measures the received radio signal power or quality from downlink transmissions from neighboring cells. When a candidate cell downlink transmission is received with a higher radio signal power or better radio signal quality than the current cell that is serving the UE, a handover procedure is initiated towards the better or best cell.

Due to the varying nature of the radio signals, it is possible that what appears to be an increase of the received radio signal power or quality of a target neighbor cell due to movement is actually a fast signal fluctuation that lasts for only a short period of time. Such fast signal changes typically do not follow a long term average trend of the path loss for a given UE movement pattern, and as a result, may create a series of handovers in a relatively short period of time which are often not beneficial or needed. Each handover has an associated "cost" due to the associated handover signaling, increased probability of the connection being dropped, possible adverse effects on higher layer protocols, e.g., that forward data packets from source cell to target cell, etc. Such a series of handovers occurring in a relatively short period of time is referred to as "handover oscillation."

Because of the cost associated with each handover, handover oscillation control is desirable. Handover parameters may be used to reduce handover oscillations between different cells. Handover parameters are usually set manually by network operators. Optimal values for handover parameters differ from cell to cell, which presents a problem if such optimal values change with time due to variations in the UE movement pattern, changes in network deployment (e.g., antenna tilt, transmission power, etc.), addition of new cell sites, etc. As a result, operators set default values for the handover parameters and only adjust those default values if a problem is detected. Unfortunately, default handover parameter settings are often not optimal. With default handover parameter values, cells that experience a high number of handover oscillations may only be able to reduce those oscillations to a certain extent, and sometimes, not sufficiently. Cells that do not experience handover oscillations would benefit from having handover parameter settings with a faster reaction time because that would mean that the UEs would spend more time in the best serving cell, thereby reducing interference to neighboring cells. (Typically, the higher the value of the handover parameter, the slower the handover decision is taken, which means a longer time period when the UE is in a non-optimal cell).

Another issue relates to modifying handover parameters. Modifying handover parameters may lead to an increase of handover failures. In that case, it would be desirable for handover performance to be monitored if there is handover oscillation control.

SUMMARY

A method and apparatus are provided for use in a cellular radio communication system for adjusting one or more handover parameters. Information is collected regarding actual handovers that have occurred between one or more pairs of cells. The collected handover information is processed to determine a handover oscillation rate or a handover cost associated with the cell pair. For example, the determined handover oscillation rate or the determined handover cost is compared with a predetermined target handover oscillation rate or a predetermined target handover cost, respectively. One or more handover parameters associated with at least one of the cells in the cell pair is adjusted based on the comparison.

A handover performance may also be determined for each of the cell pairs. Handover oscillation optimization preferably takes place only if a determined handover performance satisfies a handover performance setting. If satisfied, the collected handover information processing and handover parameter adjustment is performed. If not satisfied, no handover parameter adjustment is made or the one or more previously adjusted handover parameter(s) are reverted to the value(s) used prior to the adjustment. In one non-limiting example embodiment, the handover performance is handover failure (or success) rate.

The handover oscillation rate or handover cost comparison may include determining a difference between the determined handover oscillation rate and the target handover oscillation rate or between the determined handover cost and the target handover cost. The adjusting may include adjusting one or more handover parameters associated with at least one of the cells in the cell pair to reduce the difference. If a determined handover oscillation rate exceeds the target handover oscillation rate, then the one or more handover parameters associated with at least one of the cells in the cell pair may be adjusted to delay or prevent a handover of a call connection from the at least one cell.

The collected handover information may include a time duration that a UE connection remains at one of the cells in the cell pair after the UE connection is handed over from the other of the cells in the cell pair as well as a direction of each handover that has actually occurred between one or more pairs of cells. In example implementations, the information may be stored as a cumulative distribution function, a histogram, or stored in some other format in memory.

The handover oscillation control procedure may be carried out in a distributed fashion at each of multiple radio network nodes or in a centralized fashion at a central node in communication with a radio network node associated with the one or more cells.

The one or more handover parameters include one or both of a handover margin parameter and a time-to-trigger a handover parameter. One or both of the handover margin parameter and the time-to-trigger a handover parameter is based on one or more of the following: a frequency specific offset of a frequency of a handover candidate cell, a cell specific offset of the handover candidate cell, a frequency specific offset of the frequency of a serving cell, a cell specific offset of the serving cell, a hysteresis parameter, and an offset parameter.

DETAILED DESCRIPTION

Figure 1:
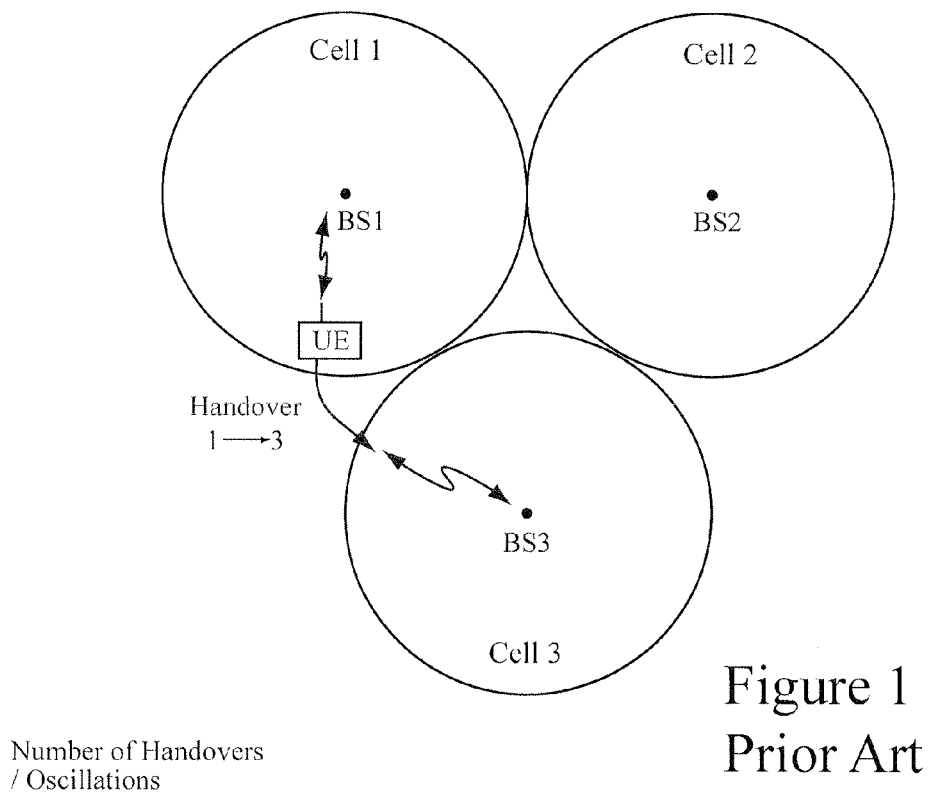
FIG. 1 is a diagram of a cellular radio system illustrating an handover.

In the following description, for purposes of explanation and not limitation, specific details are set forth such as particular architectures, interfaces, techniques, etc. However, it will be apparent to those skilled in the art that the claimed technology may be practiced in other embodiments that depart from these specific details. That is, those skilled in the art will be able to devise various arrangements which, although not explicitly described or shown herein, embody the principles of the claimed technology and are included within its spirit and scope. In some instances, detailed descriptions of well-known devices, circuits, and methods are omitted so as not to obscure the description of the present invention with unnecessary detail. All statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein represent conceptual views of illustrative circuitry embodying the principles of the technology. Similarly, it will be appreciated various processes described may be substantially represented in a computer-readable medium and can be executed by a computer or processor.

The functions of the various elements including functional blocks labelled or described as "processor" or "controller" or "computer" may be provided through the use of dedicated hardware as well as hardware capable of executing software. When provided by a processor, the functions may be provided by a single dedicated processor, by a single shared processor, or by a plurality of individual processors, some of which may be shared or distributed. Moreover, a "processor" or "controller" may include, without limitation, digital signal processor (DSP) hardware, ASIC hardware, read only memory (ROM), random access memory (RAM), and/or other storage media.

An example of a handover parameter is a hysteresis or handover margin (HOM). When the difference between the power or quality of a radio signal received from a candidate cell and the current serving cell exceeds the HOM, the UE sends a measurement or other report to the network that may trigger a handover. Note that the HOM parameter could be negative, meaning that the candidate cell is still perceived as the best cell when the UE starts sending reports. In addition, current standards allow having a specific HOM depending on a target cell group or frequency. The HOM parameter can be compiled using several handover parameters. The measurement report can be triggered when the difference between a radio signal power or quality (Mn) received from a candidate cell and a radio signal power or quality (Ms) received from the current serving cell exceeds the value of the HOM parameter. In LTE, the HOM parameter is determined using a combination of a frequency-specific offset of the frequency of the candidate cell, a cell-specific offset of the candidate cell, a frequency-specific offset of the frequency of the serving cell, a cell-specific offset of the serving cell, and a hysteresis parameter and an offset parameter both of which are specific for the candidate cell, a group of candidate cells, or all candidate cells.

Another example handover parameter is a time-to-trigger (TTT) parameter which corresponds to a minimum duration of the serving-candidate cell received signal difference exceeds the HOM parameter before transmission of a UE measurement report is triggered. As with the other handover parameters, current standards allow specific offsets to the TTT parameter for different cells, cell groups, or frequencies.

Another example handover parameter could be a filter coefficient corresponding to the amount of filtering that is applied to the serving-candidate cell received signal difference before comparing that difference to the HOM parameter. Alternatively, the filtering can be applied to the radio signal power or quality received from the current serving cell and from a candidate cell before calculating the difference. As with the other HO parameters, the filter parameter can be cell-specific, the same for a group of candidate cells, or the same for all candidate cells.

Another example handover parameter might be a secondary handover margin parameter (SHOM), which can be candidate cell specific. The HOM parameter is determined by the UE and is used to trigger transmission of a measurement report from the UE while the SHOM parameter is determined by a node in the network and is used to determine whether to perform a handover of the UE connection. After a measurement report is triggered in the UE, the UE may continue to report candidate cell measurements periodically. If the difference between a radio signal power or quality received from the current serving cell and from a candidate cell is less than the SHOM parameter, then the handover procedure to the candidate cell is initiated by the serving cell. In one non-limiting example LTE implementation, the SHOM parameter is an internal eNodeB (eNB) parameter.

Still another example handover parameter is a secondary time to trigger parameter (STTT), which can be candidate cell specific. The TTT is determined by the UE, and the STTT is determined by a node in the network. As explained above, when a UE triggers a measurement report, the UE may continue to report candidate cell measurements periodically. IF the difference between a radio signal power or quality received from the current serving cell and From a candidate cell is less than the SHOM parameter during STTT time, then the handover to the candidate cell is initiated by the serving cell. In one example LTE implementation, the STTT parameter is an internal eNB parameter.

Other example handover parameters include link adaptation settings or HARQ settings. Any parameter that influences directly or indirectly handover performance may be used.

For illustration purposes only, in following non-limiting examples, handover parameters corresponding to a hysteresis or handover margin (HOM) parameter and/or a time-to-trigger (TTT) parameter are used. Although the purpose of adjusting the value of either of one these handover parameters is to prevent, delay, or accelerate triggering of a handover in order to reduce handover oscillation, the TTT and HOM parameters may be used in some systems to trigger measurement reporting which may lead to triggering a handover, rather that triggering handover directly.

Furthermore, the non-limiting examples are described in an LTE context using HOM and/or TTT handover parameters with specific measurement report triggering offsets at the UE, SHOM and/or STTT handover parameters with specific handover triggering offsets at a network node, or at both. It is assumed that these parameters can be adjusted on an individual cell and handover direction (from one particular cell to another) basis. Other contexts and/or parameters may be employed.

In the LTE implementation example, a handover parameter can be adjusted in different ways. The following example describes different ways the UE can to increase/decrease HOM for measurement report triggering using cell-specific offsets (CO). The variables used in the various equations below are defined as follows:

1-Mn is the measurement result of the neighboring cell, not taking into account any offsets.
2-Ofn is the frequency specific offset of the frequency of the neighbor cell (i.e., offsetFreq as defined within measObjectEUTRA corresponding to the frequency of the neighbour cell).
3-Ocn is the cell specific offset of the neighbour cell (i.e., cellIndividualOffset as defined within measObjectEUTRA corresponding to the frequency of the neighbour cell), and set to zero if not configured for the neighbour cell.
4-Ms is the measurement result of the serving cell, not taking into account any offsets.
5-Ofs is the frequency specific offset of the serving frequency (i.e., offsetFreq as defined within measObjectEUTRA corresponding to the serving frequency).
6-Ocs is the cell specific offset of the serving cell (i.e., cellIndividualOffset as defined within measObjectEUTRA corresponding to the serving frequency), and is set to zero if not configured for the serving cell.
7-Hys is the hysteresis parameter for this event (i.e., hysteresis as defined within reportConfigEUTRA for this event).
8-Off is the offset parameter for this event (i.e., a3-Offset as defined within reportConfigEUTRA for this event).

Mn, Ms are expressed in dBm in case of RSRP, or in dB in case of RSRQ. Ofn, Ocn, Ofs, Ocs, Hys, Off are expressed in dB.

HOM can be defined for example using the following equations that define the condition to trigger a measurement report.

$$Mn > Ms + HOM \qquad (1)$$

$$Mn > Ms + Ofs + Ocs + Off - Ofn - Ocn - Hys \qquad (2)$$

$$HOM = Ofs + Ocs + Off - Ofn - Ocn - Hys \qquad (3)$$

The following conditions set forth in 3GPP TS 36.331 pertaining to a neighbor cell received signal exceeding the serving cell by an offset may be used. For a cell entering condition, Mn+Ofn+Ocn−Hys>Ms+Ofs+Ocs+off and for a cell leaving condition, Mn+Ofn+Ocn+Hys<Ms+Ofs+Ocs+Off.

Figure 2:
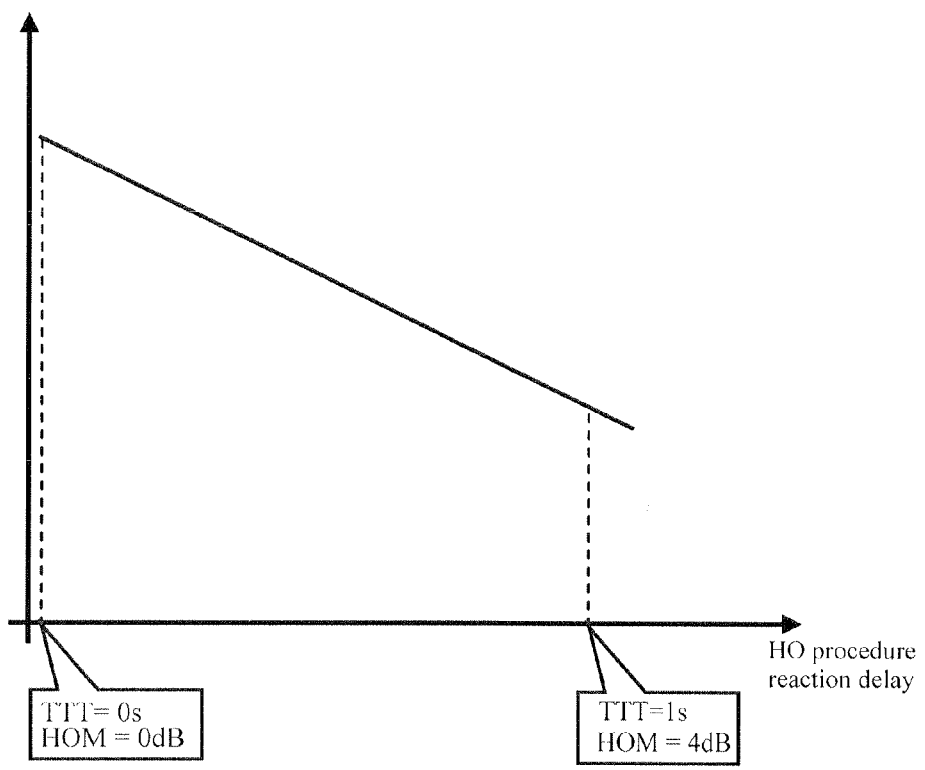
FIG. 2 is a graph showing a number of handover oscillations graphed against handover procedure reaction delay for different handover parameter values.

With HOM and TTT as example handover parameters for preventing handover oscillations between cells under normal network operation, the higher the values for TTT and HOM, the slower the handover procedure reacts to a change of best measured cell (from the UE's perspective) with the result being fewer handover oscillations. This relationship between HO procedure reaction speed and number of handovers is shown in FIG. 2.

Although a high value for TTT or HOM reduces the number of handover oscillations, a too-high value for TTT or HOM results in a handover decision making process that is too slow. This results in increased interference levels and thus decreased radio performance. In other words, UEs spend more time attached to a non-optimal cell. Another disadvantage is increased probability of handover failure because of decreased radio quality of the serving cell at the moment of handover initiation. On the other hand, a too-low TTT or HOM setting results in a handover decision making process that is too fast resulting in unnecessary signaling loads over the radio interface, in the radio network, and in the transport network, more handover failures, and possible packet losses due to effects in higher layer protocols. Therefore, an optimal setting of HOM or TTT is a balance between fast and slow handover decision time. The term "optimal setting" compasses any one of a range of settings that might be optimal.

Figure 3:
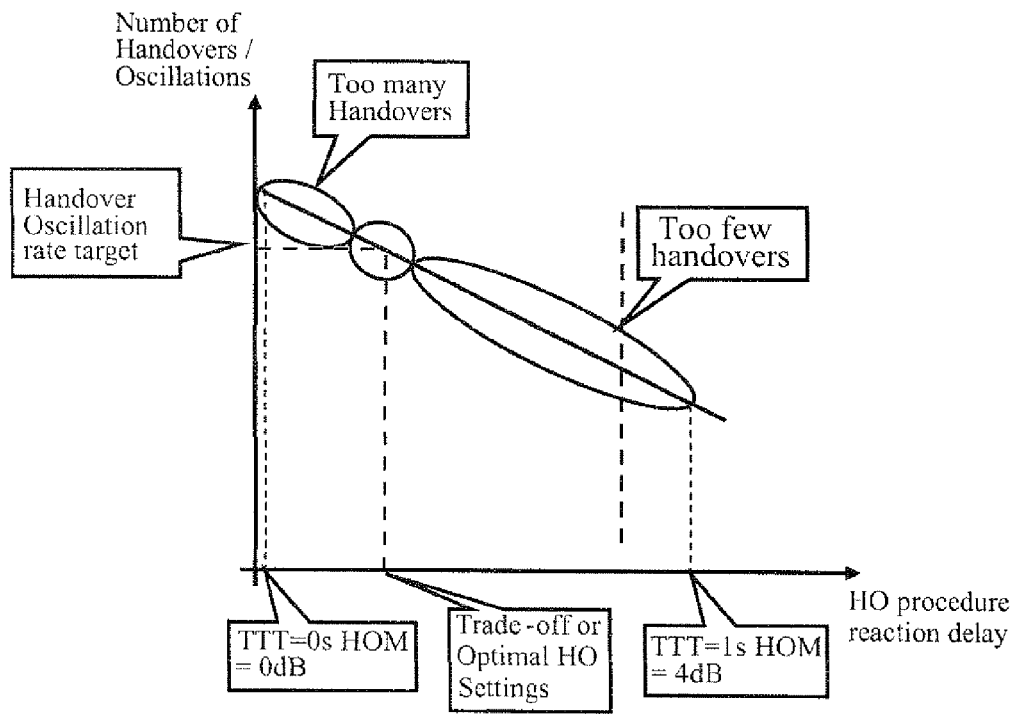
FIG. 3 is a graph showing a number of handover oscillations graphed against handover procedure reaction delay for different handover parameter values including tradeoff or optimal values.

An adjustment in a handover parameter setting results in a change in the number of handovers. Once a target handover oscillation rate is set, a "tradeoff" or optimal handover value for one or more handover parameters may be determined, as illustrated in the graph of FIG. 3. That tradeoff value is in an optimal range only as long as the network deployment and configuration and the UE behavior do not change substantially.

Figure 4:
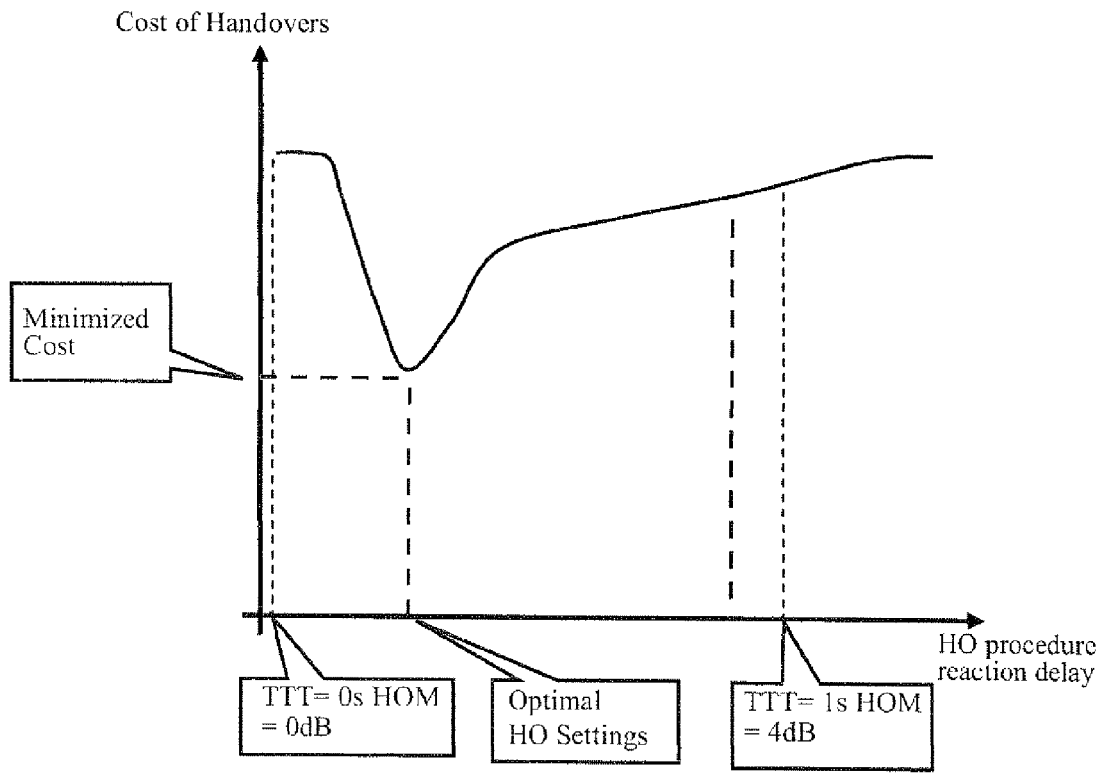
FIG. 4 is a graph showing a cost of handover graphed against handover procedure reaction delay for different handover parameter values including tradeoff or optimal values that correspond to a minimal handover cost.

Alternatively, a cost can be associated with each handover. By minimizing the cost of handover related to the same cell pair and direction (e.g., handover from cell 1 to cell 2), an optimal handover parameter setting(s) similar to the trade-off optimal value(s) shown in FIG. 3 may be achieved. An example is illustrated in FIG. 4 where a minimal handover cost corresponds to one or more optimal handover settings.

The technology in this application determines one or more optimal values for the handover parameter(s) of a specific cell pair in a dynamic way based on a predefined cell pair target handover oscillation rate or minimized handover cost function. Operation begins with default values for the handover parameters while collecting handover statistics about handovers that have actually occurred between the cells in the cell pair. These actual handover statistics are processed, either in a centralized way or in a distributed way, and a current oscillation rate is determined for each cell pair. Based on the current handover oscillation rate, a new value for the handover parameter(s) associated with handover between a pair of cells is determined. Alternatively, the new value for the handover parameter(s) associated with handover between a pair of cells may be based on minimizing a handover cost function.

Initially, information regarding handovers that have actually occurred between cell pairs is determined and collected. Starting with a default setting for the handover parameter(s), a network node logs the time between handovers for each cell pair and direction of the handover. A handover from cell 1 to cell 2 is one direction, and a handover from cell 2 to cell 1 is another direction. The time between handovers is how long a mobile radio connection remains at a cell after handover before it is handed over to another cell. If for any reason, the handover is not completed, that handover is considered failed, and a handover failure is logged instead for that cell pair and direction. The following example shows collection of handover time and direction values.

Assume that cell 1 triggers a handover to cell 2, and after 6.2 seconds in cell 2 another handover is triggered to cell 3. The value "6.2 seconds" is stored in a log (e.g., memory) for handovers from cell to cell 2. This is illustrated for multiple cell pairs and directions as shown in a simple example in FIG. 5.

Figures 5, 6:
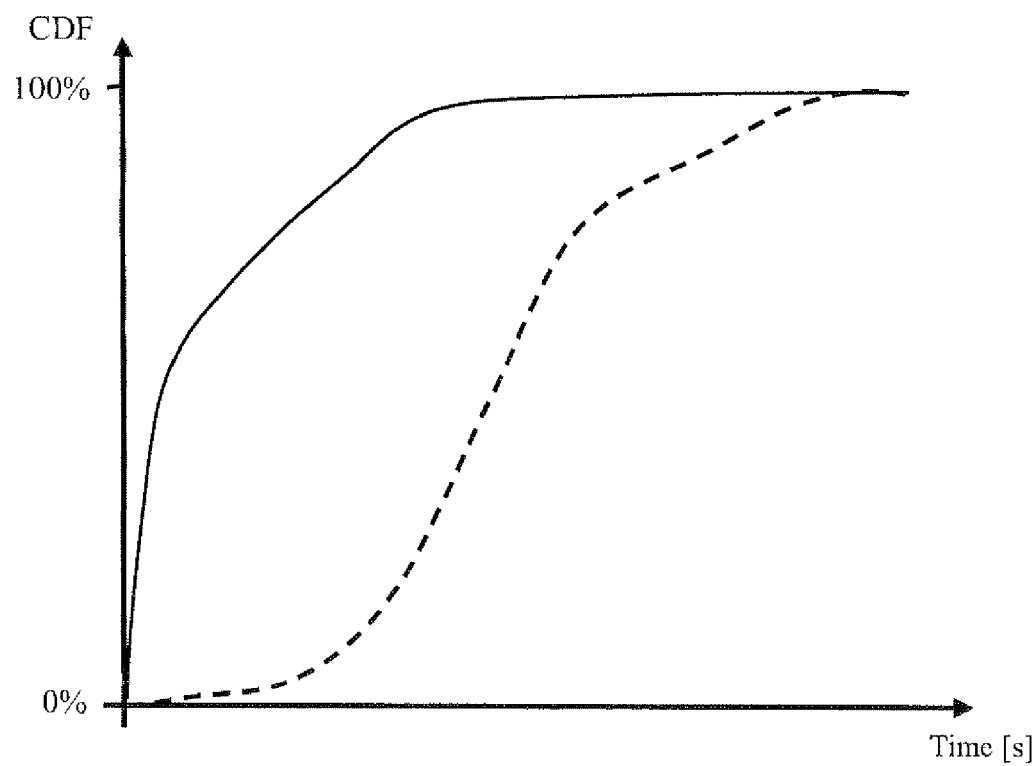
FIG. 5 is a table with non-limiting, example handover cell pair statistical data including call duration times after handover.
FIG. 6 is a graph of a non-limiting, example call duration cumulative distribution function (CDF)

The collected time-between-handovers data can be stored in different ways in order to reduce the size of the logs. For example, the duration of stay in cell 2 of UEs coming from cell 1 can be stored as a Cumulative Distribution Function (CDF). FIG. 6 shows a non-limiting Cumulative Distribution Function (CDF) of the connection durations for two different cell pairs and directions (1→2) and (1→3). The solid curve for handover from cell 1 to cell 2 corresponds to a case where a large percentage of the call connections handed over from cell 1 to cell 2 have short connection duration times in cell 2. On the other hand, the dashed line (handover of connections from cell 1 to cell 3) shows that only a few of the handovers from cell 1 have a short connection duration in cell 3 after handover to cell 3. The term call and connection are used interchangeably and include voice, data, or other information.

A handover failure log is maintained and used to calculate the handover failure rate associated with a cell pair. The handover failure rate is calculated by dividing the number of failed handovers by the total number of triggered handovers.

Figure 7:
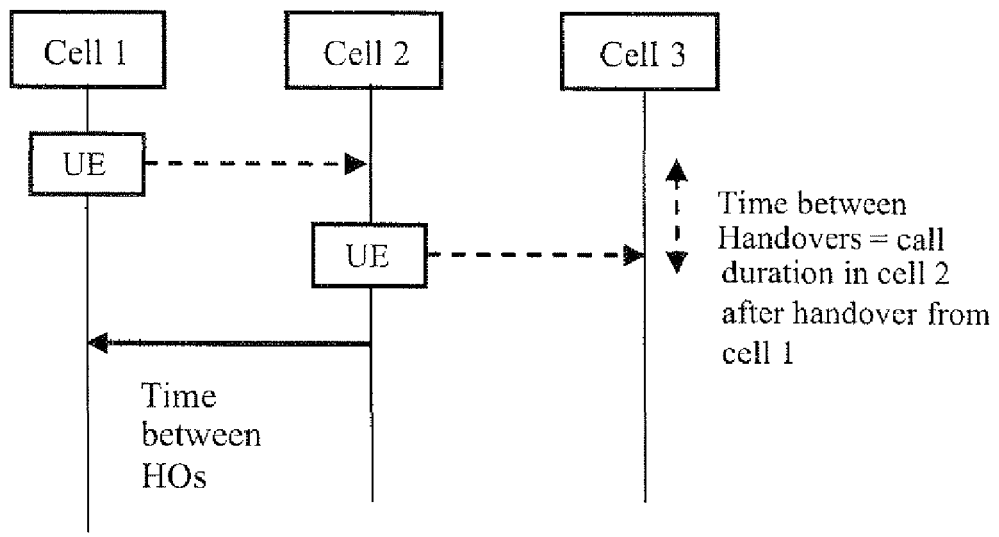
FIG. 7 is a non-limiting, example signalling diagram showing the timing between handovers corresponding to call duration after handover and reporting of same by the target cell to the source cell.
Figure 8:
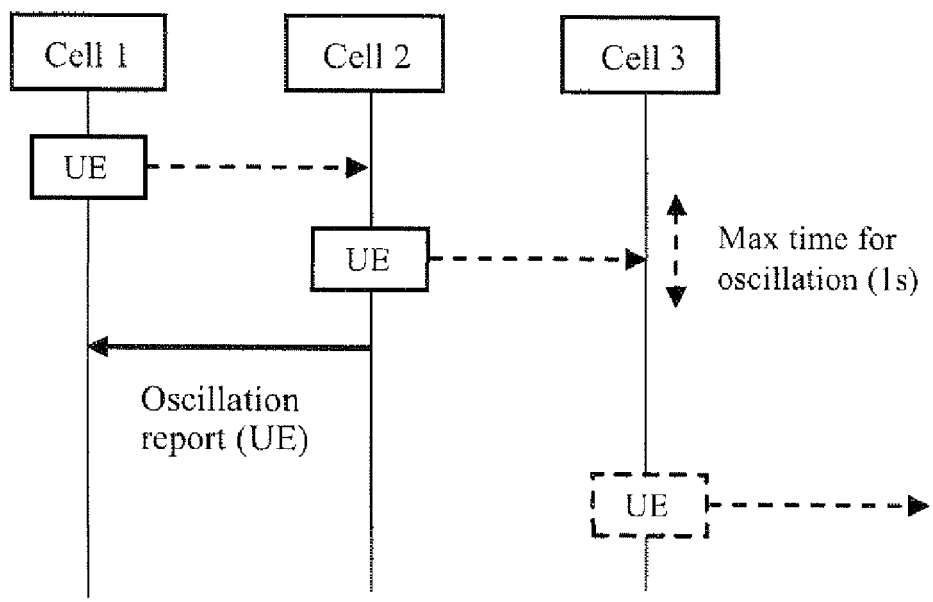
FIG. 8 is a non-limiting, example signalling diagram showing a maximum time for handover oscillation and reporting of same by the target cell to the source cell.

The data processing of the collected handover statistics for cell pairs may be performed in a central node or in a distributed way. In a centralized approach, each network node, e.g., base station, collects data regarding the time between handovers and handover failures of the different UEs in the network. The data is sent to a central node for processing and adjusting handover parameter value(s) if appropriate. In a distributed mode, each network node (e.g., the eNodeB base station in LTE) collects the time between handovers and handover failures of the UEs that are served by the node. Accordingly, the nodes associated with the target cells for those UE handovers inform the source cell node about the time duration between handovers after the connection is handed over from the source cell or a handover failure in case the HO is never completed. A non-limiting messaging example for collecting the handover statistics in a distributed fashion is shown in FIG. 7 where the label "cell" may correspond, for example, to a base station associated with that cell. FIG. 8 shows an example messaging where cell 2 sends a handover oscillation report to cell 1 when the UE call stays in cell 2 for less than one second before being handed over to cell 3. Cell 1 then logs that oscillation rate. The gathered statistics may be stored in memory in any appropriate manner including directly or indirectly as in the form of a cumulative distribution function (CDF) as mentioned above.

The gathered handover information is then processed to adjust the value of the HO parameter(s) to match the target handover oscillation rate or to minimize a handover cost. The target handover oscillation rate may be set manually by a network operator or automatically by a data processor/controller. In one non-limiting embodiment, the target handover oscillation rate may be set as one or more targets on the connection duration percentiles. For example, the target can be set to a $5^{th}$ percentile of call durations after a handover above 1 second and a $20^{th}$ percentile of call durations after handover above 10 seconds. One way of handling more than one target could be to try to meet the most challenging one. Another way could be to try to meet both targets by adjusting more than one handover parameter.

One non-limiting way to decide whether the handover oscillation control should be used is to check the handover performance associated with a particular cell pair. For example, if the handover failure rate in that cell pair is bellow a certain threshold, then the handover oscillation control algorithm is used. But if the handover failure rate in that cell pair exceeds the threshold, then the network is not functioning in a normal way, and the handover oscillation control should not be activated.

As already explained, any parameter that influences handover performance may be adjusted, but for the sake of simplicity and illustration, adjustment of handover parameters TTT and HOM is described. But both TTT and HOM need not be adjusted. For example, the handover oscillation control may optimize TTT if a load balancing controller is already adjusting HOM. Moreover, other parameters such as a measurement filtering factor or frequency of measurement reports may also be adjusted. In addition, the handover failure rate is monitored. If the handover failure rate exceeds an acceptable level, (e.g., exceeds a predefined threshold), then the handover oscillation control procedure reverts the optimized handover parameter values to the last state where the handover failure rate did not exceed the acceptable level.

Figure 9:
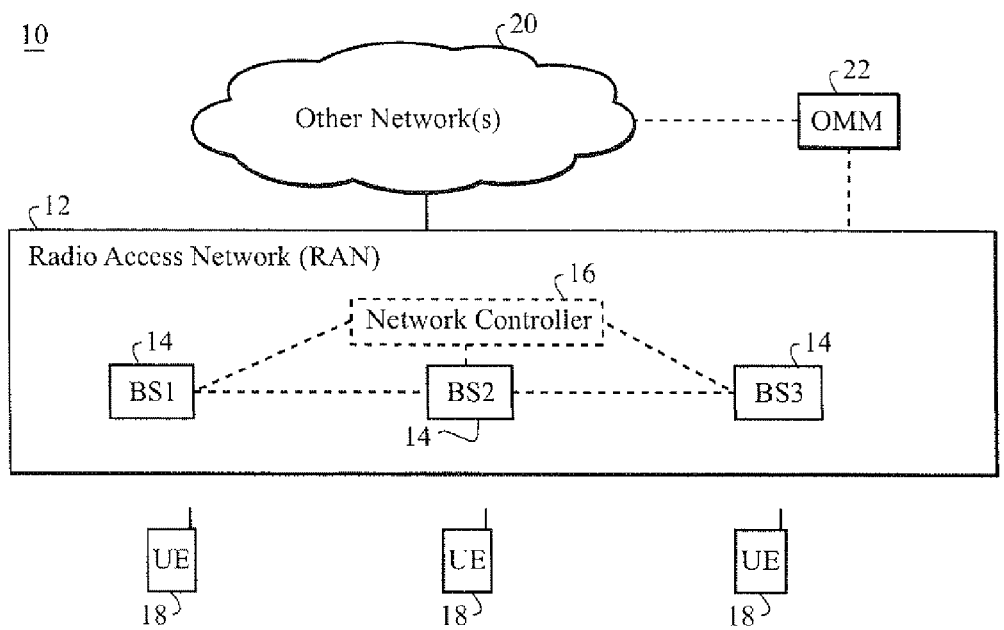
FIG. 9 is a function block diagram of a non-limiting example of a cellular communications network.

FIG. 9 illustrates a function block diagram of a non-limiting example of a cellular communications network 10. A radio access network (RAN) 12 includes multiple radio base stations 14. Depending on the type of radio access network, the base stations may communicate with each other and/or an optional radio network controller 16 shown in dash lines. The radio access network 12 is coupled to one or more other networks 20 such as one or more core networks. An operations, management, and maintenance (OMM) node 22 may be coupled to the radio access network 12 and the one or more other networks 20. The OMM node 22 may be utilized in a central handover oscillation control example embodiment described below. The radio access network communicates with multiple user equipments (UEs) 18 over a radio interface.

Figure 10:
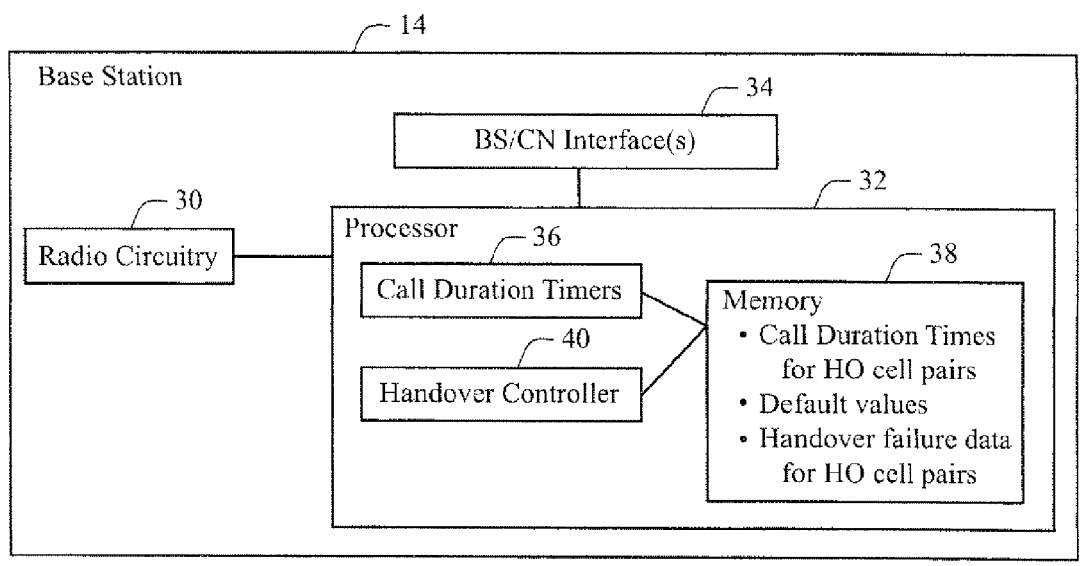
FIG. 10 is a non-limiting example function block diagram of a base station.

FIG. 10 is non-limiting example function block diagram of a base station 14. The base station 14 includes radio circuitry 30 for transmitting, receiving, and processing signals to/from UEs 18. The radio circuitry 30 is coupled to a data processor 32 which is coupled to one or more interfaces 34. For example, the interfaces made include an interface to one or more base stations (BS) or a central node (CN) such as a radio network controller or an OMM node. The former is useful in an example distributed statistical handover processing embodiment, and the latter is useful in an example centralized statistical handover processing embodiment. The processor includes one or more call duration timers 36 for keeping track of the amount of time that a UE call remains in a handover cell. A handover controller 40 is coupled to a memory 38 to store call duration times for particular handover cell pairs and directions obtained from the call duration timers 36. The memory 38 also preferably stores one or more default values for one or more handover parameters as well as handover failure data for particular handover cell pairs and directions.

Figure 11:
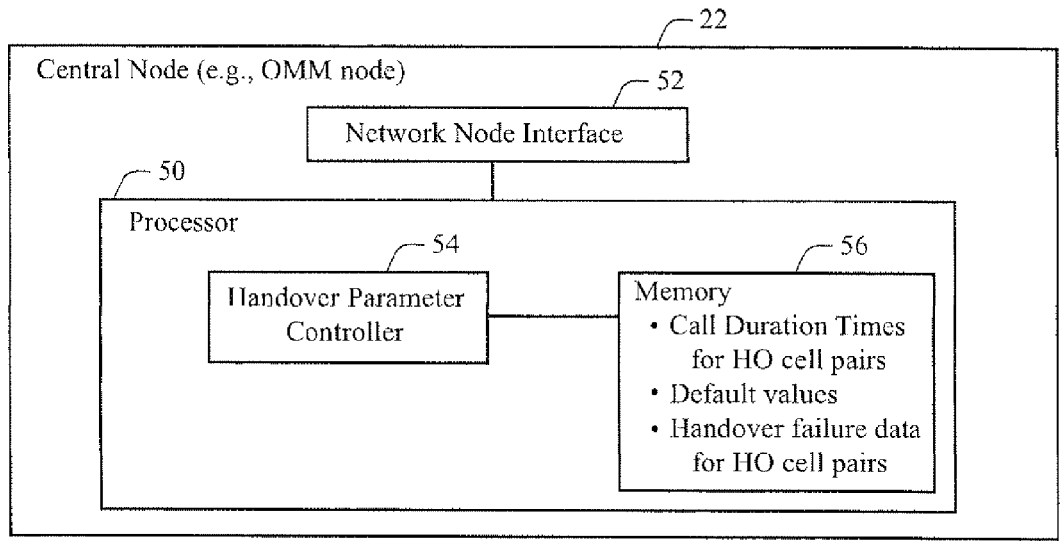
FIG. 11 is a non-limiting example function block diagram of a central node.

FIG. 11 is a non-limiting example function block diagram of a central node 22 which may be for example an OMM type node or an RNC node as non-limiting examples. The central node 22 includes a network node interface 52 coupled to a data processor 50. The data processor 50 includes a handover parameter controller 54 coupled to a memory 56 that stores call duration times for handover cell pairs and handover directions as well as handover parameter default values. The memory 56 also preferably stores one or more default values for one or more handover parameters as well as handover failure data for particular handover cell pairs and directions. The central node 22 may be used in a non-limiting example embodiment which processes handover statistics in the centralized way as opposed to a distributed way. The distributed embodiment does not require the central node.

Figure 12:
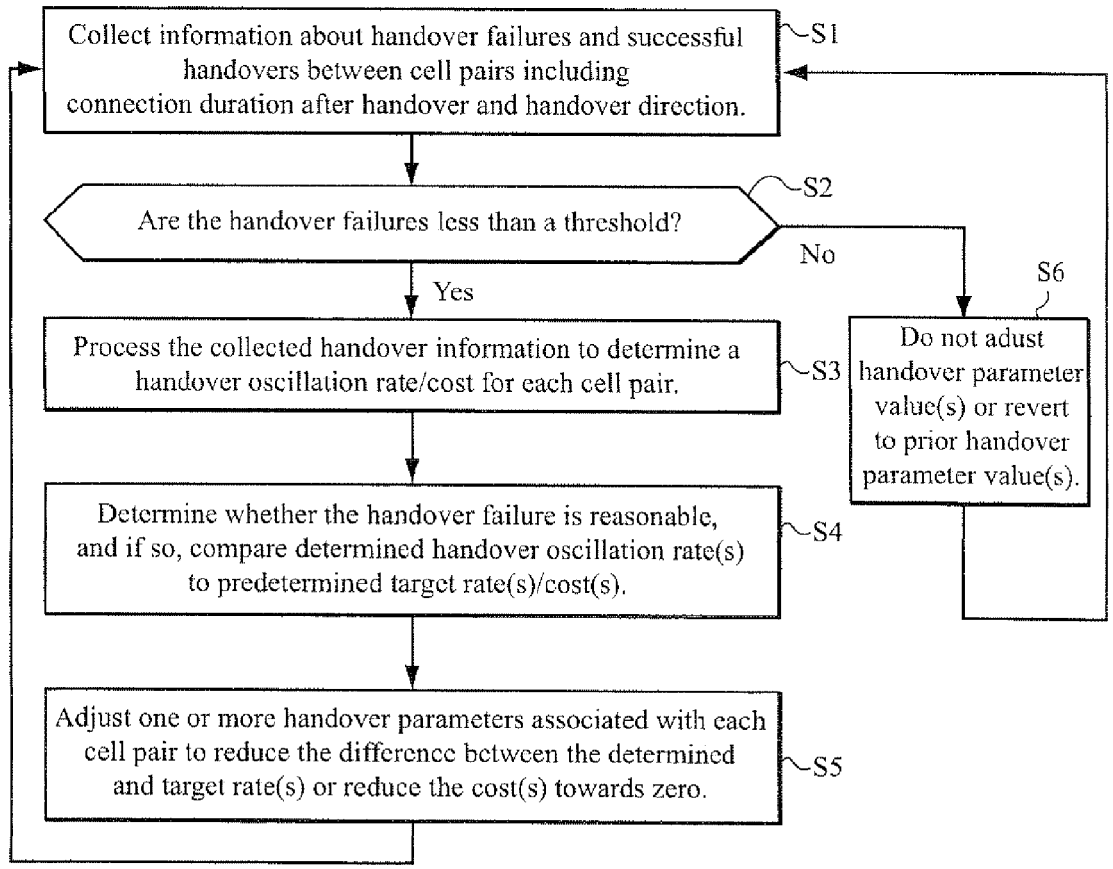
FIG. 12 is a flow chart diagram of non-limiting example procedures for adjusting one or more handover parameters based on handover statistics.

FIG. 12 is a flow chart diagram of non-limiting example procedures for adjusting one or more handover parameters based on statistics collected of actual handovers that have occurred between cell pairs. Initially, information is collected about handover failures and successful handovers between cell pairs including the connection (how long the call remains in the cell) after handover as well as the handover direction of the cell pair, e.g., from cell 1 to cell 2 (step S1). A decision is made whether any handover failure information is less that a handover failure threshold or limit (step S2). If so, the handover information is processed to determine a handover oscillation rate and/or handover cost for each of the cell pairs for each direction (step S3). A determination is made whether the handover failure is reasonable, and if so, the handover oscillation rate(s) and/or handover cost(s) is(are) compared to a predetermined target rate and/or target costs (step S4). One or more handover parameters associated with each cell pair and direction of handover between the pair is adjusted to reduce a difference between the determined and target rate and/or costs (step S5). Control returns to step S1 to gather additional information. If the decision in step S2 is negative, i.e., the handover failure rate is too high, the value(s) of the adjusted handover parameter(s) are reverted to the value(s) before the last adjustment (step S6).

The handover performance may be more generally evaluated by determining whether it satisfies a handover performance setting. In the non-limiting example above, the decision at step S2 is positive if the handover failure rate does not exceed a predetermined threshold. Another example alternative could be where the decision at S2 is positive if the handover success rate exceeds a predetermined threshold.

An example handover parameter adjustment, that may be implemented using a suitable computer, data processor, or other controller, is now described for purposes of illustration only. An example target handover oscillation rate for a single condition is assumed to be set as follows: 10th percentile of handovers with a connection duration in the target cell of 1 second. In other words, a handover oscillation occurs when a connection duration after handover to the current cell is less than 1 second in the current cell before being handed over to another cell. This allows for a single handover oscillation rate target and a simplified time between handovers reporting mechanism for distributed processing. The connection duration time is stored/logged by the source cell/base station.

Once the logged handover oscillation rate data is processed, the processed information can be used to adjust the value of the handover parameter(s) in a dynamic way to achieve the target oscillation rate. The input to a handover oscillation controller in a base station may be the collected handover oscillation rate information, which in this example is the handover oscillation rate. The controller processes this information and generates one or more adjusted handover parameters like handover margin (HOM) (hysteresis+cell specific offset) and Time to Trigger (TTT). Additionally, the following parameters may be used including an HOM initial value; TTT initial value; a control loop time period corresponding to how often the handover oscillation rate must be calculated, (e.g., if an aim is to adapt to very fast changes of user behavior, then the control loop time period is set it to a low value, but if an aim is to adapt to changes in network deployment which are typically slow, a higher value is chosen); a minimum number of handovers for calculating a handover oscillation rate for a particular cell pair (in order to have statistical relevance), where if the number of samples is too few, the evaluation is done in the next Control Loop Period; a maximum step ΔMAX for two consecutive adjustments of HOM, a target oscillation rate; a minimum value of HOM; and a maximum value for HOM.

The controller may generate an adapted HOM value for example, using the following algorithm based on a measured handover oscillation rate, target handover oscillation rate, and maximum step change ΔMAX for two consecutive adjustments of HOM:

$$HOM(k)=HOM(k-1)+\Delta_{MAX}\cdot(\text{OscilationRate}|_{HOM(k-1)}-\text{TargetOscillationRate})TTT=0 \quad (4)$$

The adapted HOM values may be calculated by each cell in the network and for all its neighbors. Additionally, a different TargetOscillationRate may be defined for each cell pair.

$$HOM_{Ci\_Cj}(k) = HOM_{Ci\_Cj}(k-1) + \Delta_{MAX}(\text{OscillationRate}_{Ci\_Cj}|_{HOM(k-1)} - \text{TargetOscillationRate}_{Ci\_Cj})$$
$$TTT_{Ci\_Cj} = 0$$

where: $j \in i, j \neq i$ where i represent all the cells in the network, and j represents all the neighbor cells of each cell in the network.

Here, TTT is set to zero. Of course, this formula is simply one example. Any other suitable algorithm may be used. For example, instead of leaving the TTT as a fixed value, (in the example above TTT is assumed to be 0), TTT may be a function of the oscillation rate.

The inventors tested by simulation the operation of this non-limiting example algorithm in a 21 cell hexagonal network with the following conditions, settings, and assumptions: LTE FDD 5 MHz at 2.0 GHz, synchronized network, 7 base station sites with 3 sectors each (21 cells), cell radius=500 m, antenna type=SCM3GPP; max gain 12.2 dB, shadowing sigma=8 dB, shadowing correlation between base stations=50%, noise factor=8 dB, typical urban multipath propagation, constant load (a new user is generated as soon as a user is finished), RSRP measurement period=200 ms; RSRP reporting period=200 ms, layer 3 filter coefficient =4 (last sample weights 50%), Time to Trigger (TTT) measurement report=0 s, margin to trigger measurement report (HOM)=adaptive (min: 0 dB, max 6 dB), straight UE moving pattern, and UE speed=30 m/s. The control algorithm was set to: HOM initial value=0 dB and adjustable to match target handover oscillation rate, TTT initial value=0 s—not adjustable, control loop period=50 s, minimum samples=50, $\Delta MAX$=2 dB, target handover oscillation Rate=10%, HOMmin=0 dB, and HOMax=6 dB.

Figure 13:
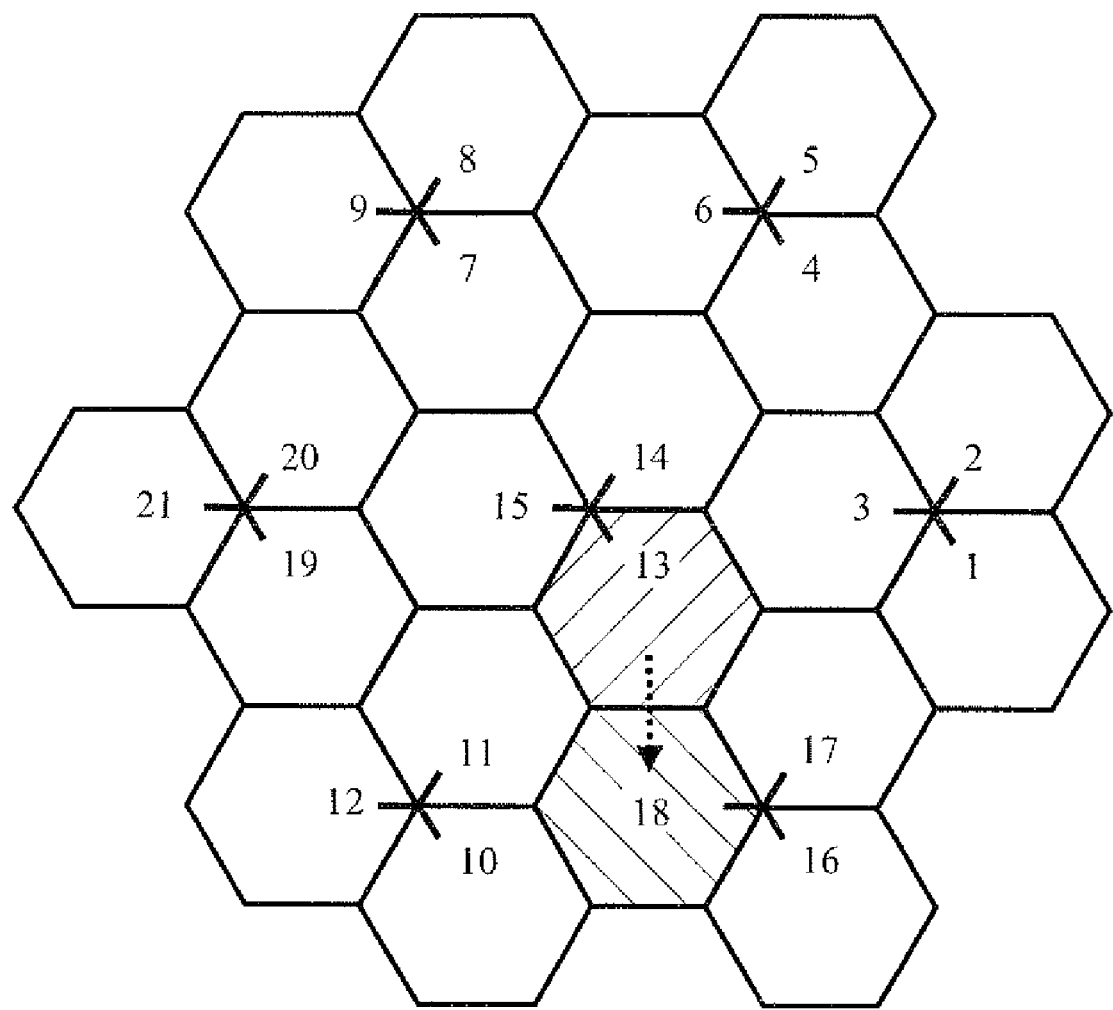
FIG. 13 illustrates a simulated, 21-cell hexagonal cell network showing handover to a close neighbour cell.

Using this simulation, the effect on a close neighbor cell is shown in FIG. 13. A UE connection is handed over from cell 13 to close neighbor cell 18, and cell 13 calculates a handover oscillation rate to cell 18 as well as each of its close neighbor cells 11, 15, 14, 3, and 17. FIG. 14 A is a graph that shows a corresponding handover oscillation rate with the target rate shown as a dashed line. FIG. 14B shows the value of the handover margin (HOM) being adjusted dynamically in response to the handover oscillation rate and converging to a value slightly above 2 dB. Initially, the handover oscillation rate is too high so the handover margin (HOM) value is increased to about 2 dB at which point the handover oscillation rate dips below the target handover oscillation rate, and the HOM is maintained at or near the 2 dB value.

Figure 14A:
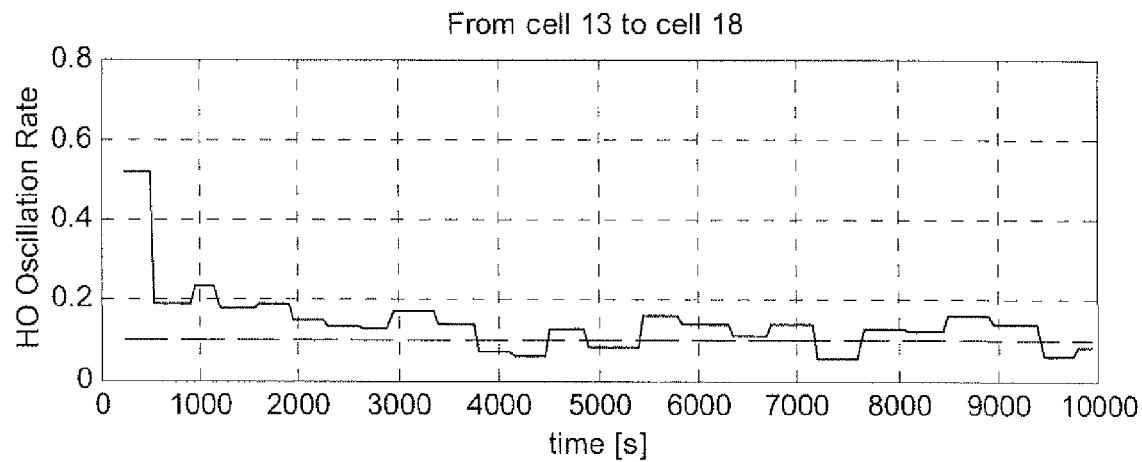
FIG. 14A graphs a handover oscillation rate relative to time for the handover to a close neighbor cell simulation shown in FIG. 13.
Figure 14B:
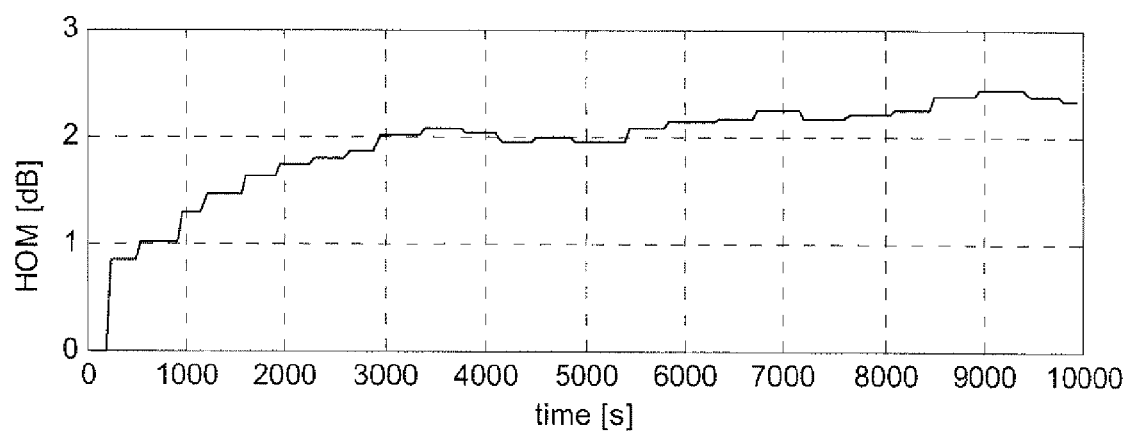
FIG. 14B graphs the adjustment of a handover margin (HOM) parameter in response to the handover oscillation rate shown in FIG. 14A.
Figure 15:
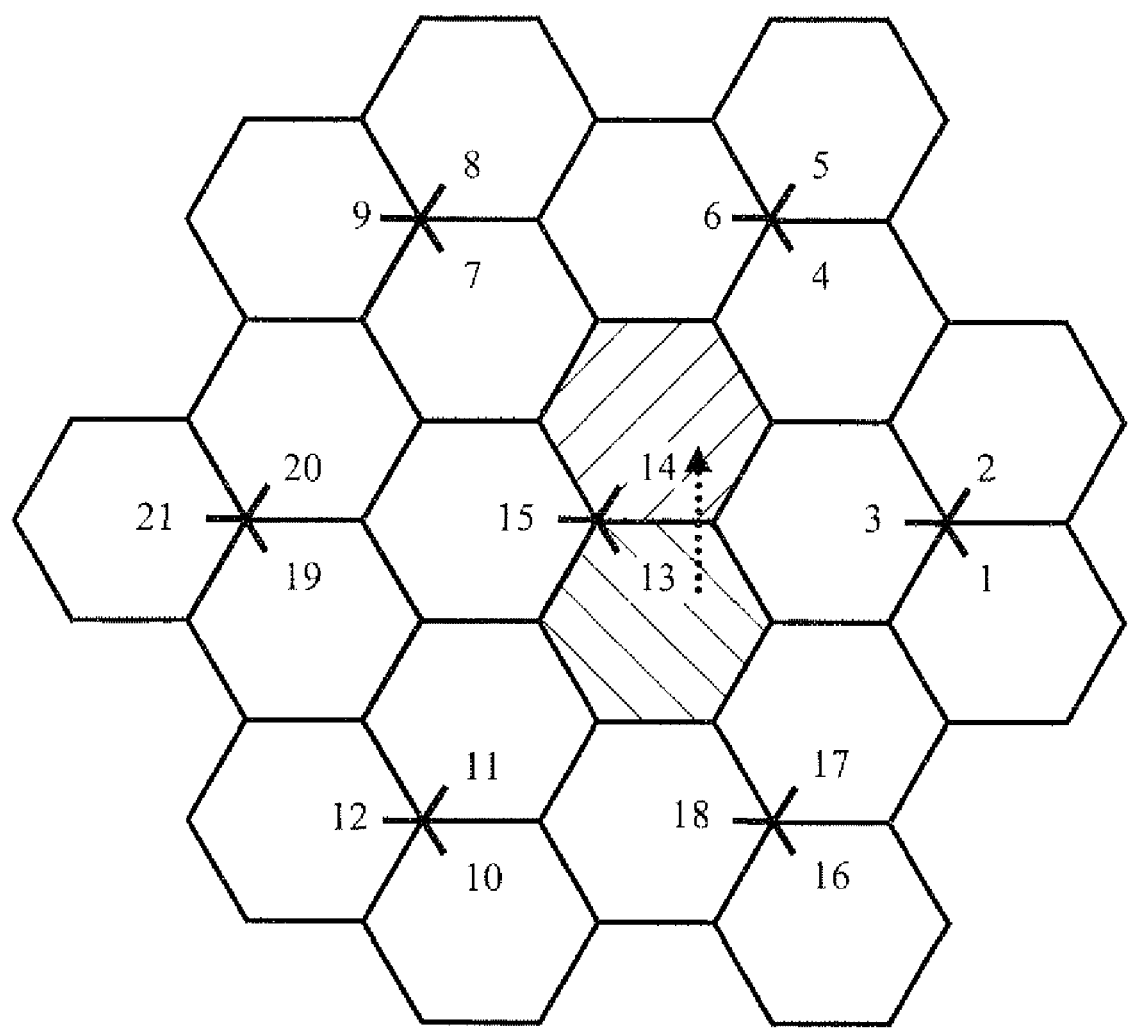
FIG. 15 shows a 21-cell hexagonal cell network and handover to a co-sited neighbor cell.
Figure 16A:
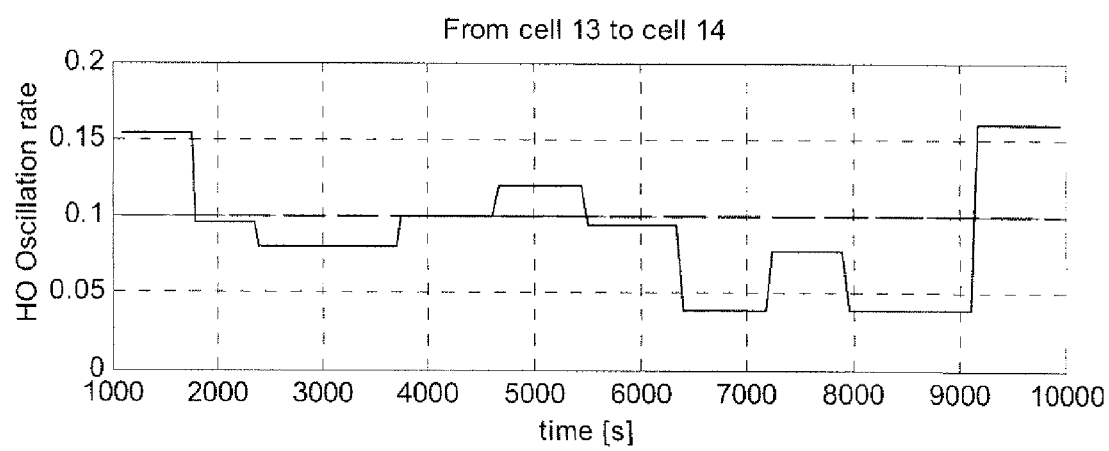
FIG. 16A is a graph showing the handover oscillation rate from the cell to its co-sited neighbour cell.
Figure 16B:
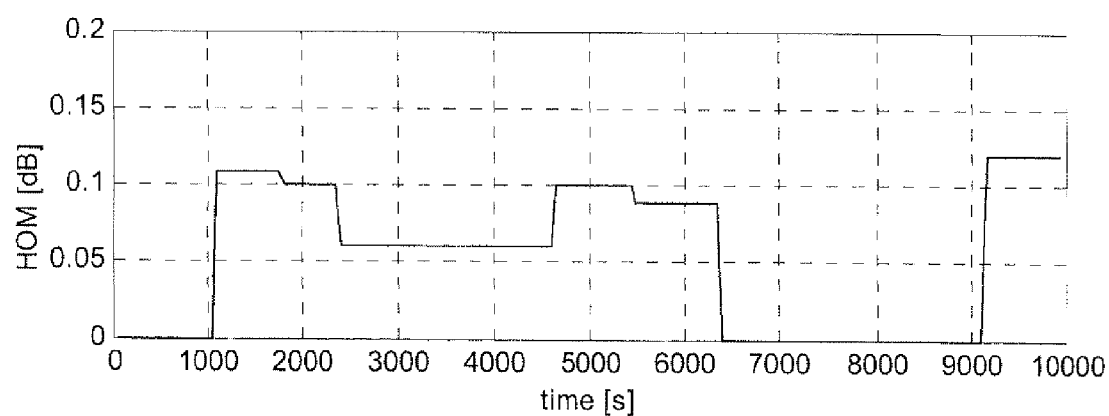
FIG. 16B illustrates a handover margin adjustment in response to the handover oscillation rate in FIG. 16A.

FIG. 14 illustrates a cellular network layout with a handover from cell 13 to a co-sited neighbor cell 14. FIG. 16A shows the simulated handover oscillation rate over time with respect to handovers from cell 13 to cell 14 with the target rate shown as a dashed line. FIG. 16B illustrates the adjustment of the handover margin (HOM) from cell 13 to cell 14 in response to the handover oscillation rate shown in FIG. 1 6A. As compared to the handover oscillation rate in FIG. 14A, the handover oscillation rate in FIG. 16A shows less oscillation because both cells 13 and 14 are served by the same base station and the border between two sectors of the same base station is typically more abrupt than that of cells from different base stations.

Figure 17:
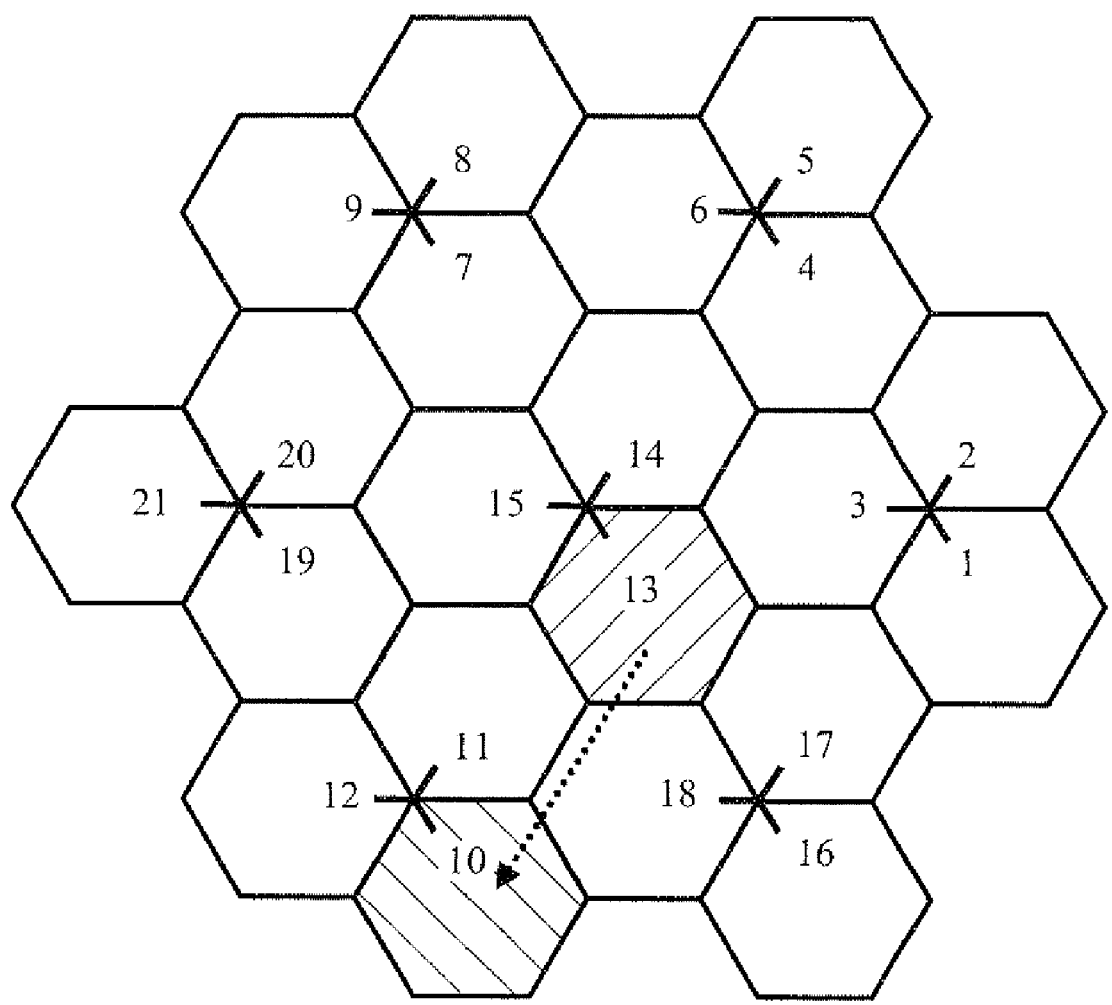
FIG. 17 illustrates a cellular network layout and handover from one cell to a distant neighbour cell.
Figure 18A:
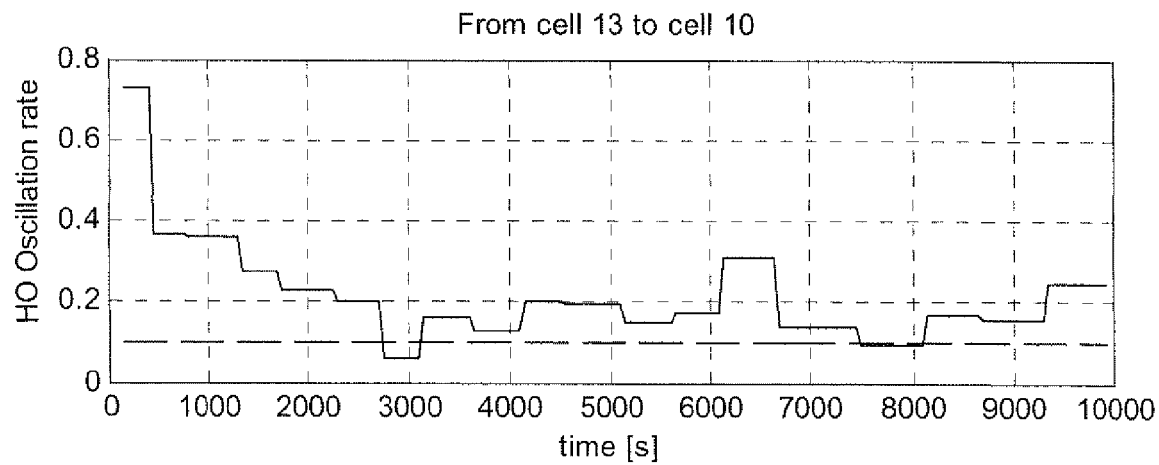
FIG. 18A is a graph illustrating the handover oscillation rate for the situation shown in FIG. 17.
Figure 18B:
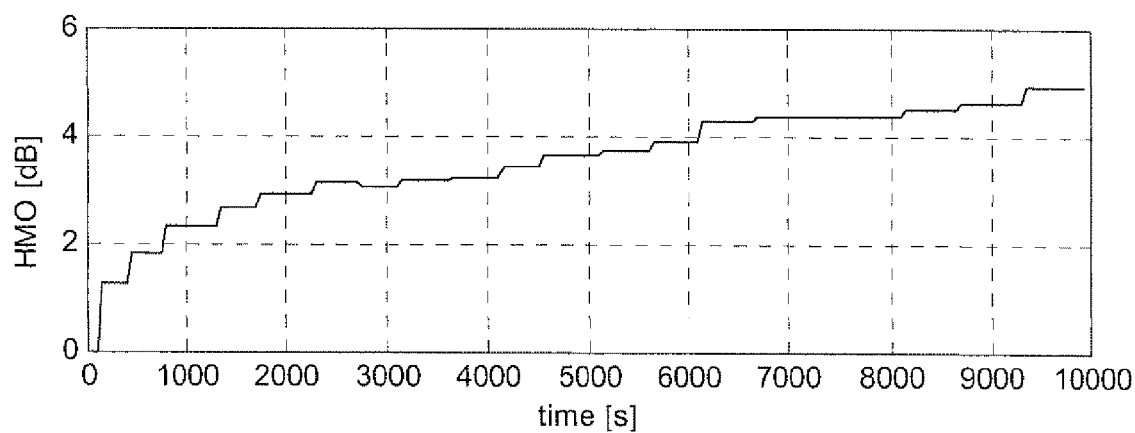
FIG. 18B is the handover margin adjustment in response to the handover oscillating rate shown in FIG. 18A.

FIG. 17 shows a cellular network layout of a handover from cell 13 to a distant neighbor cell 10. FIG. 18A illustrates the corresponding handover oscillation rate which starts at a relatively high value before being reduced to the target handover oscillation shown as a dashed line. The corresponding change in the handover margin (HOM) is shown in FIG. 18B rising quickly to 2 dB and then plateauing at a value close to 5 dB.

Figure 19:
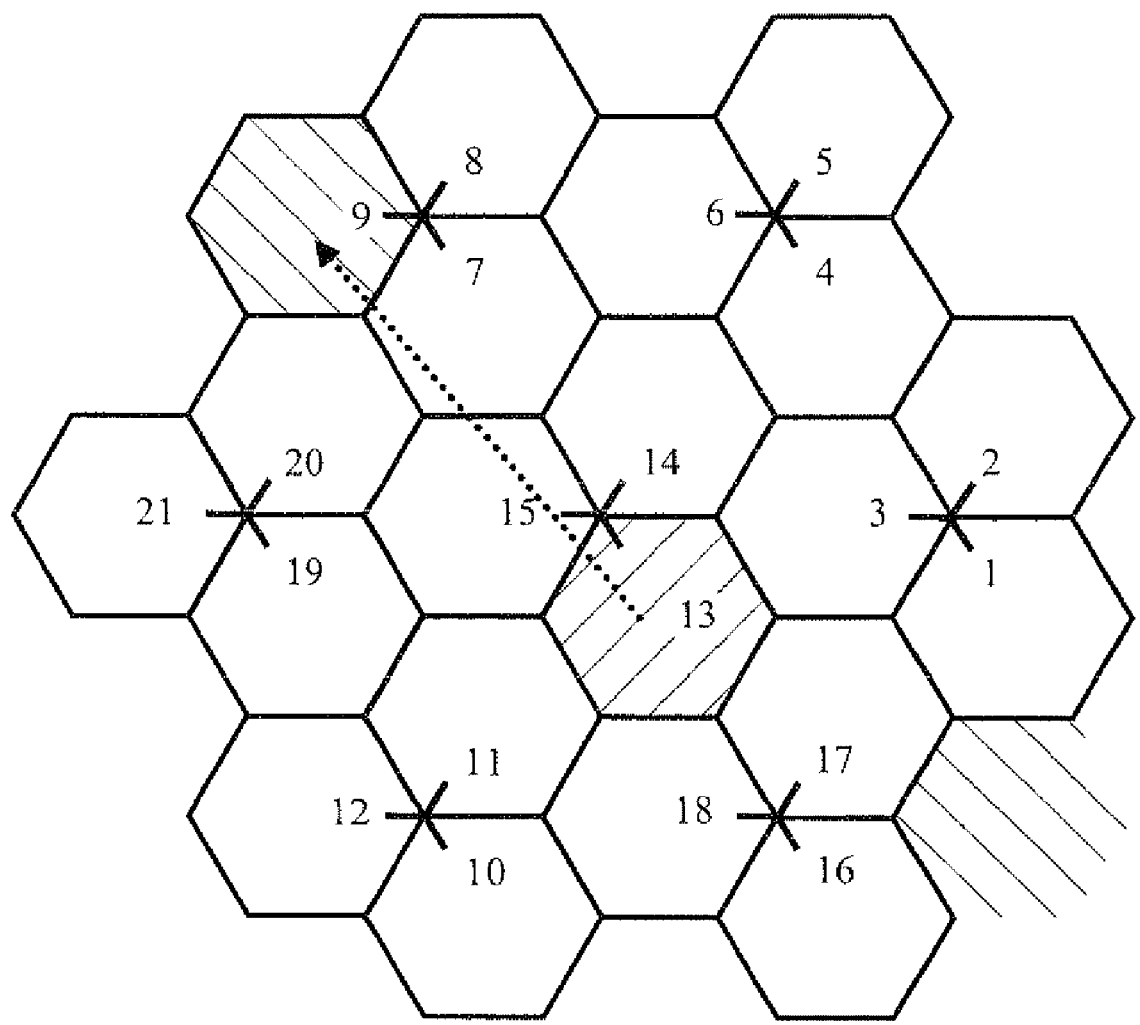
FIG. 19 is cellular network layout showing a handover from a cell to another distant neighbor cell.
Figure 20A:
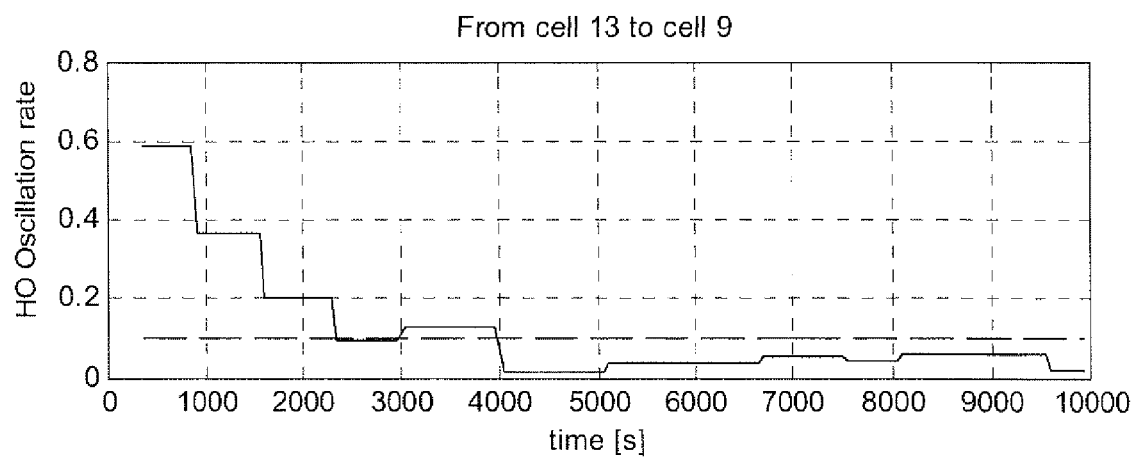
FIG. 20A is a graph of the handover oscillation rate for the situation shown in FIG. 19.
Figure 20B:
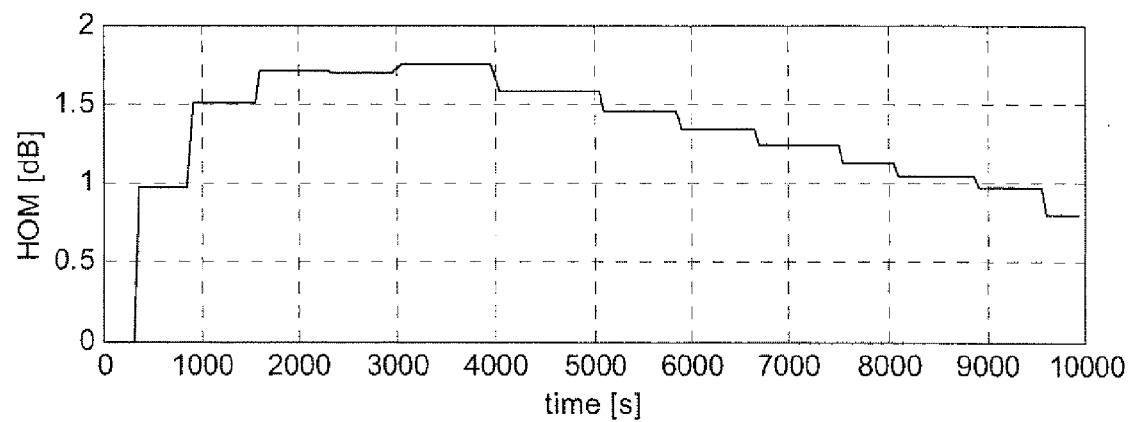
FIG. 20B is a graph of the adjustment of the handover margin associated with the handover oscillation rate shown in FIG. 20A.
Figure 11:
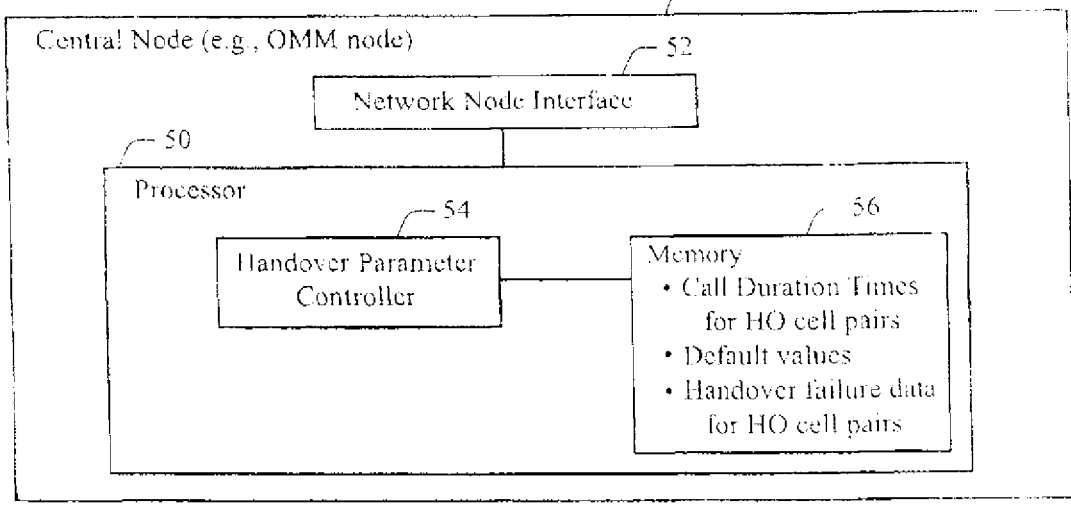
Figure 12:
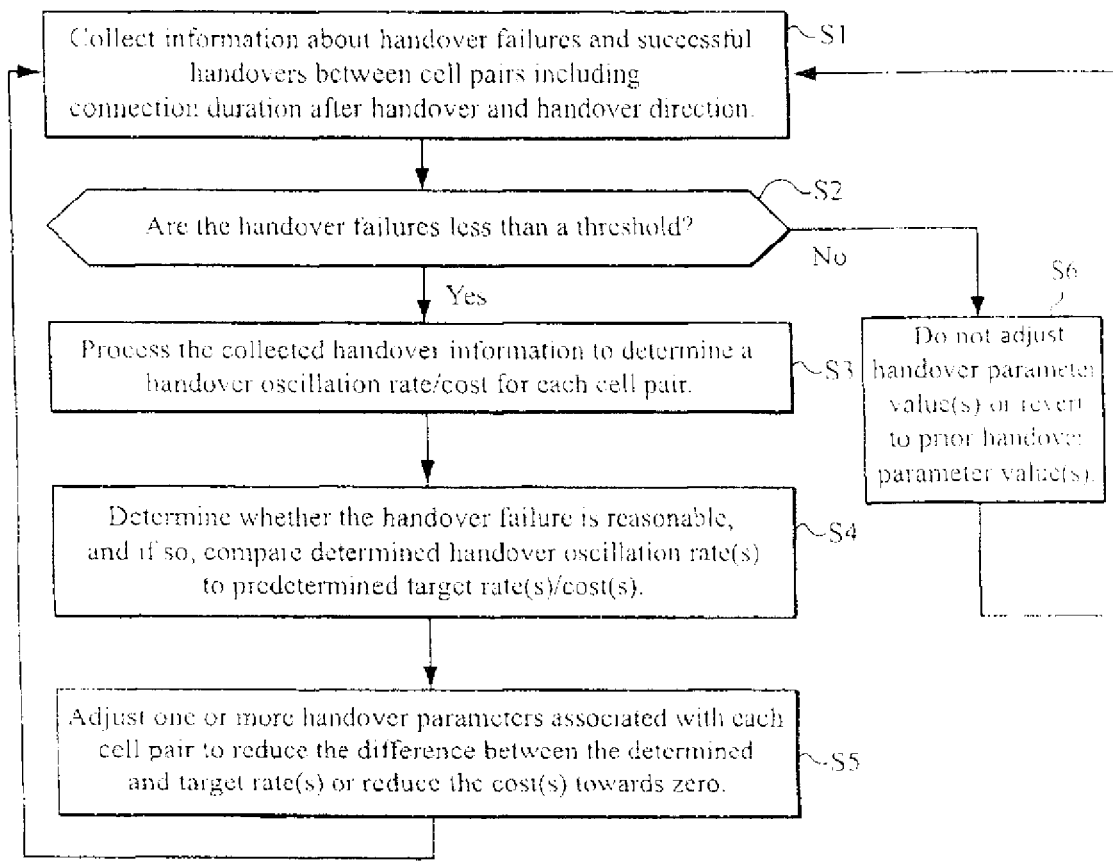

FIG. 19 illustrates a network layout of a handover from cell 13 to another distant neighbor cell 9 which is even farther away. FIG. 20A illustrates the handover oscillation rate starting off at a relatively high value and reduced rapidly to the target rate (dashed line) by adjusting the corresponding handover margin (HOM) shown in FIG. 20B. After rising to a value of approximately 1.7 dB, the HOM value is gradually reduced to adapt to a new situation in which it is not receiving oscillating handover traffic from neighboring cells including cell 9 because in the simulation, the handover oscillation control algorithm was applied in all cells in the simulated network.

As mentioned above, in a non-limiting, example embodiment, the handover oscillation control procedures preferably only act on the handover parameter(s) when the network is functioning under normal circumstances or within certain defined conditions. In a situation where the network performance is not satisfactory, e.g., the handover failure rate is above a certain threshold, or another optimization algorithm with higher priority is acting on the same parameters, the handover oscillation control preferably does not change the handover parameter(s).

In another non-limiting, example embodiment, the handover performance is monitored, e.g., the handover failure rate, and if the handover performance decreases after a handover oscillation control change is made, (e.g., the handover failure raises above certain threshold), the handover parameter values of the last state with an acceptable handover performance are used for a particular cell pair. Additionally, a warning flag may be set for that cell pair so that associated handover parameter values may be revised manually by a human or using some another algorithm.

The technology described above offers many advantages. It uses real time statistics to find optimal handover settings or a range of optimal settings for a given trade-off oscillation rate target without manual operation. The technology adapts to UE behavior and network variations with no need for UE speed estimation. The setting of a handover HO parameter according to a target oscillating rate or target handover cost also allows for improving the network performance on those cells that do not experience handover oscillations, e.g., co-sited cells in different sectors. Unwanted effects provoked by oscillations in higher protocol layers, (e.g., packets forwarded from one node to another several times until they expire), usually difficult to detect, are also protected against. In some existing systems, the logs for handover failure rate and connection duration may already be available. Some of the procedures described above can be operated off-line in central office or on-line in a distributed fashion.

The technology also makes it possible to evaluate the load increase in the transport network due to handover oscillations making it easier to dimension (backhaul leasing is an important factor in for many operators). The operator needs to set only one parameter (target handover oscillation rate) instead of many different values for neighbors that may change during operation. LTE uses Adaptive Neighbor Relation (ANR) so each cell (BS) modifies automatically its neighbour cells in a dynamic way that is not necessarily controlled by the operator.

The technology also provides one of the basic requirements for handover optimization defined by the Next Generation Mobile Networks Ltd. (NGMN) to: "Reduce the unnecessary handovers (Ping-Pong effect)—The SON feature needs to understand the situation, identify the highly influencing parameters and decide the optimal values for those parameters."

Although various embodiments have been shown and described in detail, the claims are not limited to any particular embodiment or example. None of the above description should be read as implying that any particular element, step, range, or function is essential such that it must be included in the scope of the claims. The scope of patented subject matter is defined only by the claims. The extent of legal protection is defined by the words recited in the allowed claims and their equivalents. Reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. It is not necessary for a device or method to address each and every problem sought to be solved by the present technology, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

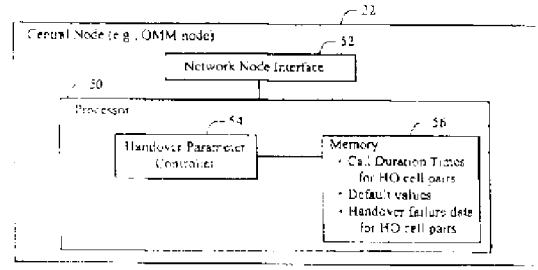

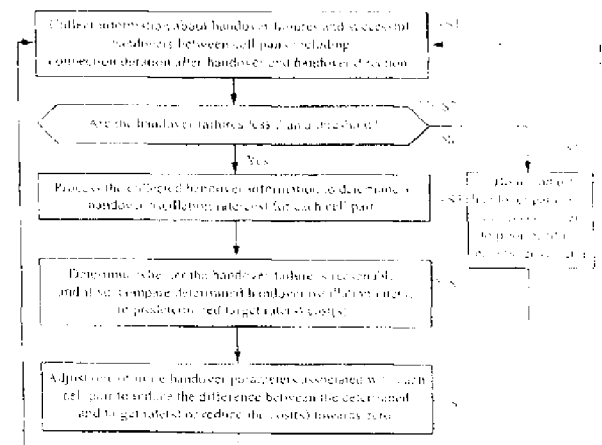

What is claimed is:

1. A method in a cellular radio communication system including a network node, comprising:
    collecting information regarding actual handovers that have occurred between one or more pairs of cells;
    the network node processing the collected handover information to determine a handover performance associated with the cell pair;
    the network node determining whether the determined handover performance satisfies a handover performance setting, and if so, processing the collected handover information to determine a handover oscillation rate or a handover cost associated with the cell pair;
    the network node comparing the determined handover oscillation rate or the determined handover cost with a predetermined target handover oscillation rate or a predetermined target handover cost, respectively; and
    adjusting one or more handover parameters associated with at least one of the cells in the cell pair based on the comparison.

2. The method of claim 1, further comprising:
    if the determined handover performance does not satisfy the handover performance setting, then refraining from adjusting the one or more handover parameters or reverting to the one or more handover parameters prior to adjustment.

3. The method in claim 1, wherein the handover performance is a handover failure rate or a handover success rate.

4. The method in claim 3, further comprising comparing the handover performance to a threshold.

5. The method in claim 1, wherein the comparison includes determining a difference between the determined handover oscillation rate and the target handover oscillation rate or between the determined handover cost and the target handover cost, and wherein the adjusting includes adjusting one or more handover parameters associated with at least one of the cells in the cell pair to reduce the difference.

6. The method of claim 1, further comprising adjusting the one or more handover parameters associated with at least one of the cells in the cell pair to delay or prevent a handover of a call connection from the at least one cell.

7. The method of claim 1, wherein the information includes a time duration that a UE connection remains at one of the cells in the cell pair after the UE connection is handed over from the other of the cells in the cell pair.

8. The method of claim 7, wherein the information includes a direction of each handover that has actually occurred between one or more pairs of cells.

9. The method of claim 8, wherein the information is stored as a cumulative distribution function or as a histogram.

10. The method of claim 8, wherein the information regarding handovers is stored in memory.

11. The method of claim 1 carried out in a distributed fashion at each of multiple radio network nodes.

12. The method of claim 1 carried out in a centralized fashion at a central node in communication with a radio network node associated with the one or more cells.

13. The method of claim 1, wherein the one or more handover parameters includes one or both of a handover margin parameter and a time-to-trigger a handover parameter.

14. The method of claim 13, wherein one or both of the handover margin parameter and the time-to-trigger a handover parameter is based on one or more of the following:
    a frequency specific offset of a frequency of a handover candidate cell, a cell specific offset of the handover candidate cell, a frequency specific offset of the frequency of a serving cell, a cell specific offset of the serving cell, a hysteresis parameter, and an offset parameter.

15. Apparatus for use in a cellular radio communication system, comprising:
    a memory for storing information regarding actual handovers that have occurred between one or more pairs of cells; and
    electronic data processing circuitry coupled to the memory and configured to perform the following functions using the stored information:
        process the collected handover information to determine a handover performance associated with the cell pair; determine whether the determined handover performance satisfies a handover performance setting, and then process the handover information from the memory to determine a handover oscillation rate or a handover cost associated with the cell pair; compare the determined handover oscillation rate or the determined handover cost with a predetermined target handover oscillation rate or a predetermined target handover cost, respectively; and regulate one or more handover parameters associated with at least one of the cells in the cell pair based on the comparison.

16. The apparatus of claim 15, wherein the electronic data processing circuitry is arranged to:
    refrain from adjusting the one or more handover parameters or revert to the one or more handover parameters prior to adjustment if the determined handover performance not satisfy the handover performance setting.

17. The apparatus in claim 16, wherein the handover performance is a handover failure rate or a handover success rate.

18. The apparatus in claim 17, wherein the electronic data processing circuitry is arranged to compare the handover performance to a threshold.

19. The apparatus of claim 15, wherein the electronic data processing circuitry is arranged to:

determine a difference between the determined handover oscillation rate and the target handover oscillation rate or between the determined handover cost and the target handover cost, and adjust one or more handover parameters associated with at least one of the cells in the cell pair to reduce the difference.

20. The apparatus of claim 14, wherein the electronic data processing circuitry is arranged to:

adjust the one or more handover parameters associated with at least one of the cells in the cell pair to delay or prevent a handover of a call connection from the at least one cell.

21. The apparatus of claim 14, wherein the information includes a time duration that a UE connection remains at one of the cells in the cell pair after the UE connection is handed over from the other of the cells in the cell pair.

22. The apparatus of claim 19, wherein the information includes a direction of each handover that has actually occurred between one or more pairs of cells.

23. The apparatus of claim 20, wherein the information is stored as a cumulative distribution function or as a histogram.

24. The apparatus of claim 14, wherein the cellular radio communication system includes a radio access network with multiple radio base stations, and wherein the apparatus is included in each radio base station.

25. The apparatus of claim 14, wherein the cellular radio communication system includes a radio access network with multiple radio base stations and a central node in communication with the radio network, wherein the apparatus is included in the central node.

26. The apparatus of claim 14, wherein the electronic data processing circuitry includes call duration timing circuitry configured to monitor call duration times for calls handed over to one of the cells in a cell pair until those calls are handed over to another cell.

27. The apparatus of claim 14, wherein the one or more handover parameters includes one or both of a handover margin parameter and a time-to-trigger a handover parameter.

28. The apparatus of claim 25, wherein one or both of the handover margin parameter and the time-to-trigger a handover parameter are based on one or more of the following: a frequency specific offset of a frequency of a handover candidate cell, a cell specific offset of the handover candidate cell, a frequency specific offset of the frequency of a serving cell, a cell specific offset of the serving cell, a hysteresis parameter, and an offset parameter.

* * * * *

UNITED STATES PATENT AND TRADEMARK OFFICE
CERTIFICATE OF CORRECTION

| | | |
|---|---|---|
| PATENT NO. | : 8,331,936 B2 | Page 1 of 4 |
| APPLICATION NO. | : 12/431380 | |
| DATED | : December 11, 2012 | |
| INVENTOR(S) | : Alonso-Rubio et al. | |

It is certified that error appears in the above-identified patent and that said Letters Patent is hereby corrected as shown below:

The title page showing the illustrative figure should be deleted to be replaced with the attached title page.

In the Drawings:

The drawing sheet, consisting of Fig. 12, should be deleted to be replaced with the drawing sheet, consisting of Fig. 12, as shown on the attached page.

In Fig. 18B, Sheet 12 of 14, delete "HMO" and insert -- HOM --, therefor.

In the Specifications:

In Column 4, Line 2, delete "FIG. 1 8A;" and insert -- FIG. 18A; --, therefor.

In Column 4, Line 3, delete "is" and insert -- is a --, therefor.

In Column 4, Line 6, delete "19;" and insert -- 19; and --, therefor.

In Column 5, Line 44, delete "IF" and insert -- If --, therefor.

In Column 5, Line 46, delete "From a" and insert -- from a --, therefor.

In Column 6, Line 7, delete "he" and insert -- be --, therefor.

In Column 7, Line 58, delete "cell to" and insert -- cell 1 to --, therefor.

In Column 8, Line 55, delete "bellow" and insert -- below --, therefor.

In Column 11, Line 56, delete "FIG. 1 6A." and insert -- FIG. 16A. --, therefor.

Signed and Sealed this
Eleventh Day of June, 2013

Teresa Stanek Rea
*Acting Director of the United States Patent and Trademark Office*

In the Claims:

In Column 14, Line 34, in Claim 15, delete "Apparatus" and insert -- An apparatus --, therefor.

(12) United States Patent
Alonso-Rubio et al.

(10) Patent No.: US 8,331,936 B2
(45) Date of Patent: Dec. 11, 2012

(54) AUTOMATIC HANDOVER OSCILLATION CONTROL

(75) Inventors: Jose Alonso-Rubio, Stockholm (SE); Fredrik Gunnarsson, Linköping (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 500 days.

(21) Appl. No.: 12/431,380

(22) Filed: Apr. 28, 2009

(65) Prior Publication Data
US 2010/0273487 A1  Oct. 28, 2010

(51) Int. Cl.
H04W 36/00 (2009.01)

(52) U.S. Cl. ...... 455/436; 370/331; 370/332; 370/508; 714/26

(58) Field of Classification Search ............... 455/436; 370/331, 332, 508; 714/28
See application file for complete search history.

(56) References Cited

U.S. PATENT DOCUMENTS

| | | | | |
|---|---|---|---|---|
| 5,524,009 A * | 6/1996 | Tuutijarvi et al. | | 370/332 |
| 5,995,836 A | 11/1999 | Wijk et al. | | |
| 5,999,814 A | 12/1999 | Cuffaro et al. | | |
| 6,085,335 A * | 7/2000 | Djoko et al. | | 714/26 |
| 6,285,883 B1 | 9/2001 | Bringby et al. | | |
| 6,745,033 B1 | 6/2004 | Shah et al. | | |
| 7,248,873 B2 * | 7/2007 | Lehtinen et al. | | 455/436 |
| 2004/0266434 A1 * | 12/2004 | Lehtinen et al. | | 455/436 |
| 2006/0003768 A1 | 1/2006 | Chiou | | |
| 2006/0251130 A1 * | 11/2006 | Greer et al. | | 370/508 |
| 2008/0096560 A1 * | 4/2008 | Felske et al. | | 455/436 |
| 2010/0273487 A1 * | 10/2010 | Alonso-Rubio et al. | | 455/436 |
| 2010/0284374 A1 * | 11/2010 | Evans | | 370/332 |
| 2011/0026492 A1 * | 2/2011 | Frenger et al. | | 370/331 |

FOREIGN PATENT DOCUMENTS

WO  WO 99/57933  11/1999

OTHER PUBLICATIONS

NGMN Alliance et al., NGM Recommendation on SON & O&M Requirements, Version 1.23, Dec. 5, 2008.
International Search Report and Written Opinion mailed May 19, 2010 in corresponding PCT Application PCT/EP2010/053903.
Markopoulos, A., et al., "Performance of Cellular Networks and Mobile Location-Driven Handover Algorithms", May 17, 2004, Vehicular Technology Conference, 2004, VTC 2004-Spring, 2004 IEEE 59th, Milan, Italy, pp. 2430-2436, XP010766596.

* cited by examiner

Primary Examiner — William D Cumming
(74) Attorney, Agent, or Firm — Nixon & Vanderhye P.C.

(57) ABSTRACT

A method and apparatus are provided for use in a cellular radio communication system for adjusting a handover parameter. Information is collected regarding actual handovers that have occurred between one or more pairs of cells as well as handover failures. The collected handover information is processed to determine a handover oscillation rate or a handover cost associated with the cell pair. If the handover performance is determined to be acceptable, the determined handover oscillation rate or the determined handover cost is compared with a predetermined target handover oscillation rate or a predetermined target handover cost, respectively. One or more handover parameters associated with at least one of the cells in the cell pair is adjusted based on the comparison.

28 Claims, 14 Drawing Sheets